(12) United States Patent
Vornehm

(10) Patent No.: US 6,945,897 B2
(45) Date of Patent: Sep. 20, 2005

(54) BRANCHED POWER TRANSMISSION HAVING A CONTINUOUSLY VARIABLE TRANSMISSION RATIO

(75) Inventor: Martin Vornehm, Bühl (DE)

(73) Assignee: LuK Lamellen und Kupplungsbau Beteiligungs KG, Bühl (DE)

(*) Notice: Subject to any disclaimer, the term of this patent is extended or adjusted under 35 U.S.C. 154(b) by 61 days.

(21) Appl. No.: 10/759,517

(22) Filed: Jan. 16, 2004

(65) Prior Publication Data

US 2004/0214681 A1 Oct. 28, 2004

(30) Foreign Application Priority Data

Jan. 17, 2003 (DE) .......................................... 103 01 620

(51) Int. Cl.$^7$ ............................................. F16H 37/02
(52) U.S. Cl. ..................................................... 475/211
(58) Field of Search .............................. 475/211, 219, 475/218

(56) References Cited

U.S. PATENT DOCUMENTS

| | | | | | |
|---|---|---|---|---|---|
| 2,117,340 | A | * | 5/1938 | Albrecht | 475/211 |
| 3,046,814 | A | * | 7/1962 | Soehrman | 475/211 |
| 4,936,165 | A | * | 6/1990 | Doyle et al. | 475/72 |

* cited by examiner

*Primary Examiner*—Dirk Wright
(74) *Attorney, Agent, or Firm*—Alfred J. Mangels

(57) ABSTRACT

A branched power transmission whose transmission ratio is continuously variable and that includes two planetary transmissions, each having a sun gear, a planet gear, and a ring gear, and a speed change mechanism having a pair of driven shafts. One gear of the first planetary transmission is non-rotatably connected with an input shaft and provides a rotational connection between the input shaft and the driven shafts of the speed change mechanism. One gear of the second planetary transmission is non-rotatably connected with an output shaft and provides a rotational connection between the output shaft and the driven shafts of the speed change mechanism.

7 Claims, 2 Drawing Sheets

BRANCHED POWER TRANSMISSION HAVING A CONTINUOUSLY VARIABLE TRANSMISSION RATIO

BACKGROUND OF THE INVENTION

1. Field of the Invention

The present invention relates to a branched power transmission having a continuously variable transmission ratio.

2. Description of the Related Art

Transmissions having a continuously variable transmission ratio and that contain a speed change mechanism along with two pairs of conical disks around which a belt passes, are attracting more and more interest, not only because of the high level of driving comfort that they achieve, but also because of the possible wear reduction.

Known branched power transmission structures are characterized by the fact that at one limit of the transmission ratio of the branched power range, through the adjustability of the speed change mechanism, they impose only a slight load on the speed change mechanism. In that range the overall transmission ratio of the transmission is only slightly changed when the speed change mechanism transmission ratio is adjusted, whereas at the other limit of the branched power range the speed change mechanism basically transfers all of the power. In the latter range, in any event, the overall transmission ratio of the branched power transmission is heavily dependent on that of the speed change mechanism.

In the design of such transmissions, the "worst" operating point, at one edge of the transmission ratio range, which limits the moment and spread capacity attainable with branched power transmissions, must always be taken into account. In view of the high peak pressures and volume flows, the construction of a hydraulic system for the adjustment of the transmission ratio of the speed change mechanism, that is, in a continuously variable transmission, the adjustment of the spacings between the conical disks in the conical disk pairs becomes more difficult, and the construction of the conical disk pairs themselves is more expensive because of the higher contact and adjustment forces involved. For the design of the endless torque-transmitting means (for example, a plate-link chain) and the formation of the conical surfaces, the operating point with the greatest load is crucial.

An additional characteristic of known branched power transmissions involves their complex structure, with numerous mechanical connections between individual active transmission components, such as the speed change mechanism and the planetary transmission. In many cases, an intermediate shaft must transfer the torque from one side of the speed change mechanism to the other. Connected therewith is often the individual adjustment of numerous components in order to conform with a wide range of motor-vehicle- or engine-specific requirements.

The invention is based on the task of providing a solution for the problems set forth above.

SUMMARY OF THE INVENTION

A solution of that task is provided by a branched power transmission with a continuously variable transmission ratio. It includes two planetary transmissions, each with a sun gear, a carrier, a ring gear, and a speed change mechanism with an input side driven shaft and an output side driven shaft, the transmission ratio of which is continuously variable. One of the components of the first planetary transmission is non-rotatably connected with an input shaft, and the first planetary transmission forms a rotational connection between the input shaft, the input side driven shaft, and the output side driven shaft. One of the components of the second planetary transmission is non-rotatably connected with an output side driven shaft, and the second planetary transmission forms a rotational connection between the output side driven shaft, the input side driven shaft, and an output shaft.

In a branched power transmission in accordance with the invention, the speed change mechanism, which is advantageously constructed in the form of a continuously variable transmission but can also take the form of a friction disc transmission, or the like, is loaded at all operating points with a similar, preferably naturally low power.

It is advantageous for both of the planetary transmissions to be identical to each other.

The number of different components can be reduced by having the transmission contain two assemblies having identical components, of which one includes the first planetary transmission and the input half of the speed change mechanism, and the other includes the second planetary transmission and the output half of the speed change mechanism.

In a preferred embodiment of a transmission in accordance with the invention, one component of the first planetary transmission is in rotational engagement with the output side driven shaft through a first coupling gear, and one component of the second planetary transmission is in rotational engagement with the input side driven shaft through a second coupling gear.

An advantageous embodiment of the above-noted transmission is characterized by the fact that at least one coupling gear can be uncoupled from one of the components with which it is in rotational engagement. In that way, the transmission in accordance with the invention can be expanded into a transmission with several continuously adjustable transmission ratio ranges.

A further advantageous embodiment of the transmission in accordance with the invention is characterized by the fact that one component of the first planetary transmission is in direct rotational engagement with the output side driven shaft, and one component of the second planetary transmission is in direct rotational engagement with the input side driven shaft.

Advantageously, the ring gears of the planetary transmissions are located on the input side driven shaft and the output side driven shaft, respectively, of the speed change mechanism.

In a further development of the transmission in accordance with the invention, at least one clutch is provided, with which at least one of the planetary transmissions is blocked in such a way that the transmission ratio of the transmission can be subdivided into two successive transmission ratio ranges with a continuously variable transmission ratio.

In one installation application, two such transmission ratio ranges can advantageously also be provided for bringing the engine up to speed (no load/low load), and a second range with an especially low spread can be provided for long-term operation, for example in the form of a synchronization control for several engine assemblies.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
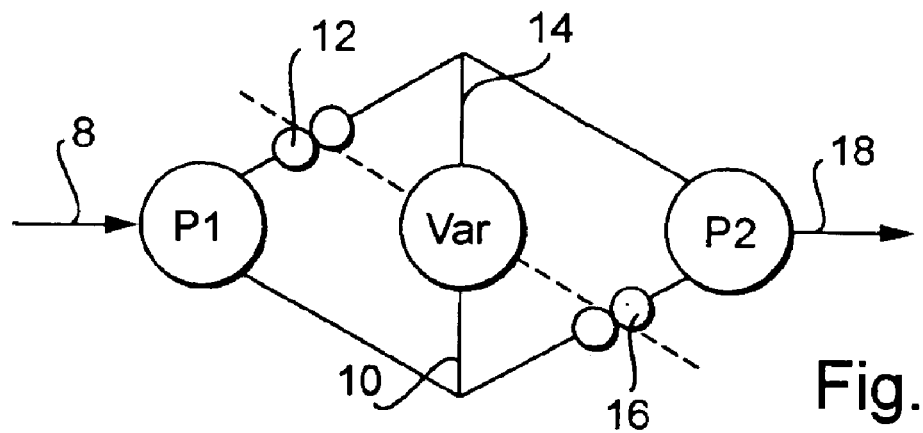
FIG. 1 is a schematic view of the structure of a transmission in accordance with the invention.

In the branched power transmission shown in FIG. 1, a input shaft 8 is connected to one gear of a planetary transmission P1, whose other gears are connected to an input side driven shaft 10 of a speed change mechanism (Var) and through a coupling device 12 to an output side driven shaft 14 of the speed change mechanism. Output side driven shaft 14 of the speed change mechanism is also connected to a gear of a second planetary transmission P2, whose other gears are connected through a coupling device 16 to input side driven shaft 10 and to a output shaft 18.

The above-mentioned gears of the planetary transmissions P1 and P2 can be the planet carrier, the sun gear, and the ring gear of each.

In the structure shown, there is no functional difference between the input side driven shaft 10 and the output side driven shaft 14 of the speed change mechanism. The torque flow direction depends on the transmission ratio stages in planetary transmissions P1 and P2 and the coupling devices 12 and 16. Input shaft 8, by way of example, is connected by means of a starting clutch with the engine of a motor vehicle. Output shaft 18 conducts the torque to the driven wheels of the motor vehicle, for example through a differential stage.

The transmission structure shown in FIG. 1 has 6×6=36 possible configurations, in which gears of planetary transmissions P1 and P2 can be connected to the speed change mechanism.

Figure 2:
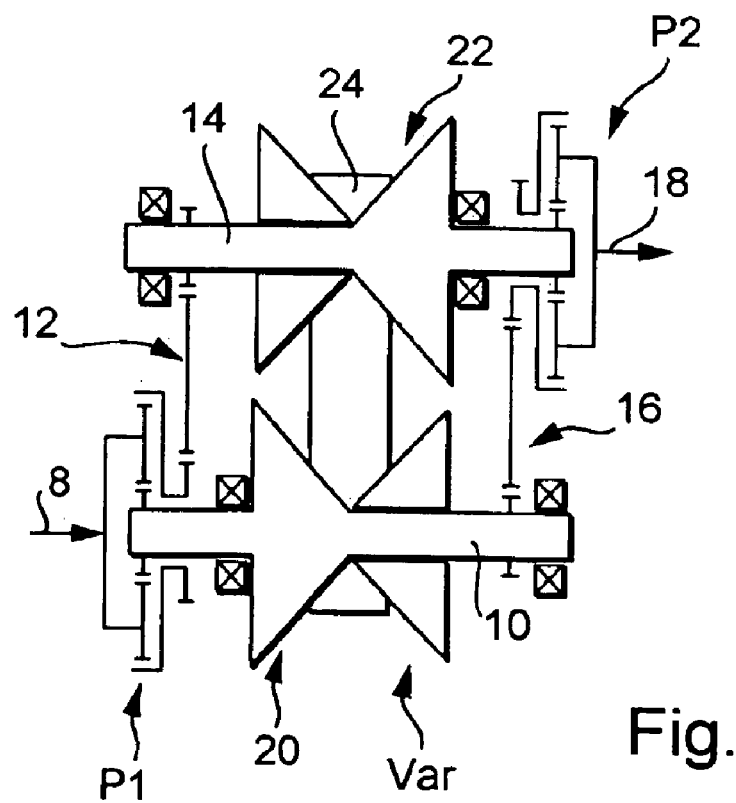
FIG. 2 is a diagrammatic view of a first exemplary embodiment of a transmission in accordance with FIG. 1.

FIG. 2 shows an example in which the speed change mechanism (Var) contains two pairs of conical disks 20 and 22, around which an endless torque-transmitting means 24 passes, for example a plate-link chain.

In accordance with FIG. 2, input shaft 8 is non-rotatably connected with the carrier of planetary transmission P1, whose planet gears mesh with the ring gear and the sun gear of planetary transmission P1. The sun gear is non-rotatably connected with input side driven shaft 10, or the shaft of conical disk pair 20. The ring gear, which is advantageously supported on input side driven shaft 10, has external teeth that mesh through a coupling gear of coupling device 12 with a gear that is non-rotatably connected with output side driven shaft 14.

In an analogous manner, output shaft 18 is non-rotatably connected with the carrier of planetary transmission P2, the planet gears of which mesh with the sun gear, which is non-rotatably connected with output side driven shaft 14, and the ring gear. The ring gear is advantageously supported on output side driven shaft 14 and has external teeth that mesh through a coupling gear of coupling device 16 with a gear that is non-rotatably connected with input side driven shaft 10.

Advantageously, conical disk pairs 20 and 22 as well as planetary transmissions P1 and P2 and the coupling devices, that is, the coupling devices that include the external teeth of the ring gears, the coupling gears, and the gears that are non-rotatably connected with the driven shafts of the speed change mechanism, are constructed identically to each other so that transmission collectively includes two half-transmissions of identical construction and manages with a minimal number of different components.

Figure 3:
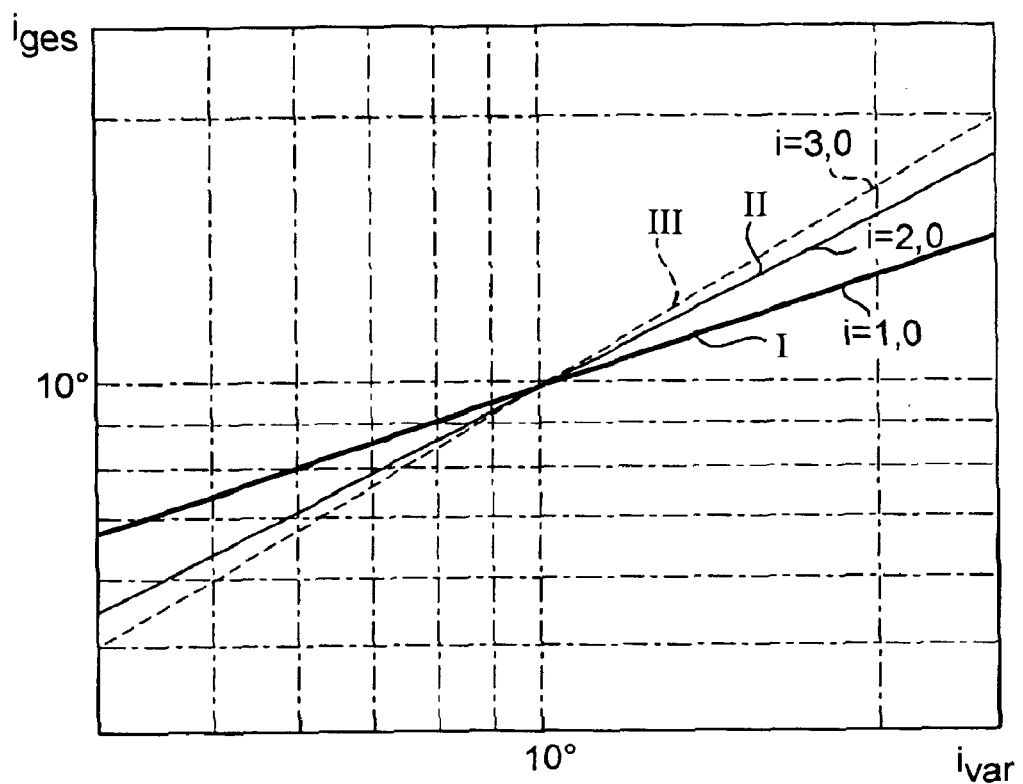
FIG. 3 shows a transmission ratio diagram for the transmission in accordance with FIG. 2.

FIG. 3 shows transmission ratio diagrams for the transmission in accordance with FIG. 2, in which the abscissa represents the transmission ratio $i_{var}$ of the speed change mechanism, the ordinate represents the overall transmission ratio $i_{ges}$ of the transmission, and the three plots I, II and III represent the overall transmission ratio of the transmission as a function of the speed change mechanism transmission ratio for three different transmission ratios of the coupling device.

In the double logarithmic representation shown, the speed change mechanism transmission ratio $i_{var}$ extends from 0.4 to 2.5, that is, the speed change mechanism has a spread of 6.25. It is also possible to use a speed change mechanism with a larger or smaller spread, whereby only a section of the diagram then remains applicable. Depending upon the coupling device, the total spread of the transmission is between 2 and 4, whereby the course of the transmission ratio is independent of the coupling device transmission ratio, which is nearly linear in the double logarithmic representation, and whereby the gradient of the coupling device transmission ratio is offset. In conventional branched power transmissions the course of the transmission ratio in the representation shown in FIG. 3 is distinctly curved, which leads to very different loads on the speed change mechanism at the respective ends of the transmission range. The course in accordance with FIG. 3 means that the speed change mechanism transmits substantially a constant portion of the engine power output, independently of its particular transmission ratio at any given time, which in the example shown, depending upon the coupling device transmission ratio, is between 30% and 40% of the engine power output.

In a transmission variant that is modified relative to FIG. 2, the output side driven shaft 14 is connected with the ring gear of planetary transmission P2 and, through the coupling gear, to the sun gear of planetary transmission P1. Correspondingly, input side driven shaft 10 is non-rotatably connected with the ring gear of planetary transmission P1, and meshes with the sun gear of planetary transmission P2 through the coupling gear of coupling device 16.

Figure 4:
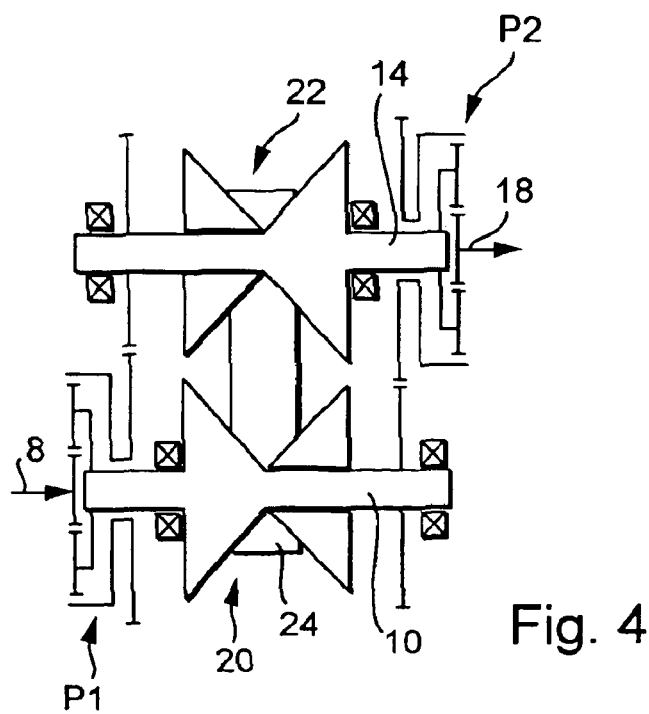
FIG. 4 is a diagrammatic view of a further exemplary embodiment of a transmission in accordance with FIG. 1.

FIG. 4 shows a variant of the structure shown in FIG. 1, in which the intermediate coupling gears 12 and 16 are not present, and the respective components and/or gears of the planetary stages and/or planetary transmissions P1 and P2 mesh directly with the driven shafts of the speed change mechanism.

In the example shown, the sun gear of planetary transmission P1 is non-rotatably connected with input shaft 8 and is in rotational engagement with the ring gear by way of the planet gears, and which, similar to the embodiment in accordance with FIG. 2, is supported on input side driven shaft 10, but which, opposite from the embodiment in accordance with FIG. 2, meshes directly with a gear that is non-rotatably connected with output side driven shaft 14.

Similarly, output shaft 18 is non-rotatably connected with the sun gear of planetary transmission P2, which meshes with the ring gear that is supported on output side driven shaft 14 through the planet gears. The ring gear has external teeth that mesh directly with a gear that is non-rotatably connected with input side driven shaft 10.

The ring gears of the respective planetary transmissions are non-rotatably connected with input side driven shaft 10 and output side driven shaft 14.

The transmission according to FIG. 4 is also constructed of two half-transmissions that are identical to each other, which are formed by the endless torque-transmitting means 24 and the meshing engagements between the gears that are non-rotatably connected with driven shafts 10 and 14, respectively, and the external teeth of the ring gears.

The exemplary representations of transmissions in accordance with the invention, which are advantageously constructed of two half-transmissions that are identical to each other, can be utilized and modified in a variety of ways. A speed change mechanism with a spread of 6, which is suitable for a power of 150 kW, for example, can be utilized with the help of two planetary transmissions to provide a transmission with a continuously variable transmission ratio with which, at a spread of 2.5, power of 300 kW can be transferred.

On the other hand, transmissions having the structure in accordance with FIG. 1 can be supplemented at little cost by being shifted in a known manner between various transmission ratio ranges with the help of clutches and/or brakes. With regard to producing a switching point, coupling device transmission ratios of about 2.4 or 0.4 are suitable, because then at the edge of the speed change mechanism spread (0.4 to 2.4), one planet circulates while being blocked, so that it can be blocked with a clutch, and at the same time another clutch or brake can be opened. Both the planetary transmission and the coupling device are amenable to the installation of clutches and/or brakes.

It should be understood that each type of speed change mechanism can also be installed in the transmission structure in accordance with the invention, for example friction or hydrostatic transmissions.

Although particular embodiments of the present invention have been illustrated and described, it would be apparent to those skilled in the art that various changes and modifications can be made without departing from the spirit of the present invention. It is therefore intended to encompass within the appended claims all such changes and modifications that fall within the scope of the invention.

What is claimed is:

1. A branched power transmission comprising: first and second planetary transmissions each including a sun gear, a planet gear, and a ring gear; a speed change mechanism having a continuously variable transmission ratio and an input side driven shaft and an output side driven shaft; wherein one gear of the first planetary transmission is non-rotatably connected with an input shaft and the first planetary transmission provides a rotational connection between the input shaft, the input side driven shaft, and the output side driven shaft; and wherein one gear of the second planetary transmission is non-rotatably connected with an output shaft and the second planetary transmission provides a rotational connection between the output shaft, the input side driven shaft, and the output side driven shaft.

2. A transmission according to claim 1, wherein the planetary transmissions are similarly configured.

3. A transmission according to claim 1, wherein the transmission contains two substantially identically constructed assemblies, a first of which assemblies is the first planetary transmission and an input portion of the speed change mechanism, and a second of which assemblies is the second planetary transmission and an output portion of the speed change mechanism.

4. A transmission according to claim 1, including a first and a second coupling device, wherein one gear of the first planetary transmission is in rotational engagement with output side driven shaft through the first coupling device, and wherein one gear of the second planetary transmission is in rotational engagement with the input side driven shaft through the second coupling device.

5. A transmission according to claim 1, wherein one gear of the first planetary transmission is in direct rotational engagement with the output side driven shaft, and one gear of the second planetary transmission is in direct rotational engagement with the input side driven shaft.

6. A transmission according to claim 1, wherein the ring gear of the first planetary transmission is supported on the input side driven shaft, and the ring gear of the second planetary transmission is supported on the output side driven shaft.

7. A transmission according to claim 1, including at least clutch for dividing the transmission ratio of at least one planetary transmission into two successive transmission ranges having continuously variable transmission ratios.

* * * * *